United States Patent [19]
Williams

[11] 3,960,030
[45] June 1, 1976

[54] MOTORCYCLE BRAKE SYSTEM
[75] Inventor: Stephen S. Williams, Woodinville, Wash.
[73] Assignee: The Raymond Lee Organization, a part interest
[22] Filed: Oct. 3, 1974
[21] Appl. No.: 511,646

[52] U.S. Cl. .................................. 74/481; 74/489; 180/77 R; 188/106 P; 188/106 R
[51] Int. Cl.² ...................................... G05G 11/00
[58] Field of Search ............ 74/481, 480, 479, 487, 74/489; 180/77 R; 188/24, 26, 106 R, 106 P

[56] References Cited
UNITED STATES PATENTS

| | | | |
|---|---|---|---|
| 1,674,751 | 6/1928 | von Luettwite | 188/26 X |
| 1,763,096 | 6/1930 | Franklin | 188/26 X |
| 1,910,527 | 5/1933 | Dormoy | 188/26 X |

*Primary Examiner*—Samuel Scott
*Assistant Examiner*—F.D. Shoemaker

[57] ABSTRACT

A motorcycle has a front brake, a rear brake, a hand-operated lever, and a foot-operated pedal. The lever operates two cables. The first cable is connected to the front brake. The second cable is connected to the front end of an elongated rod that is attached to the rear brake and that applies the rear brake by being pulled forwardly along its axis. Sliding means connects the pedal to the rod. When the hand-operated lever is operated, both the front and rear brakes are applied. When the pedal is depressed, only the rear brake is applied.

3 Claims, 6 Drawing Figures

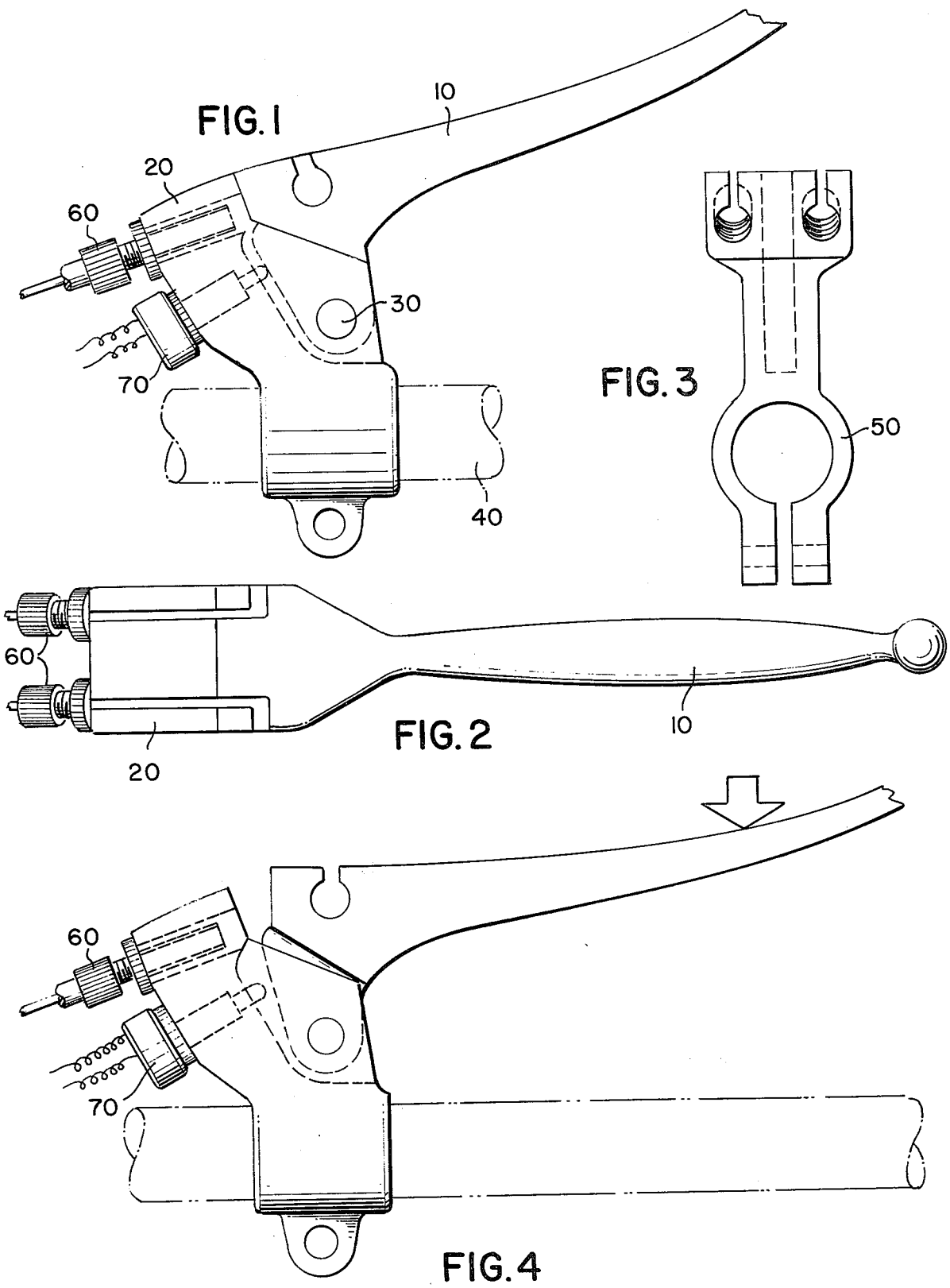

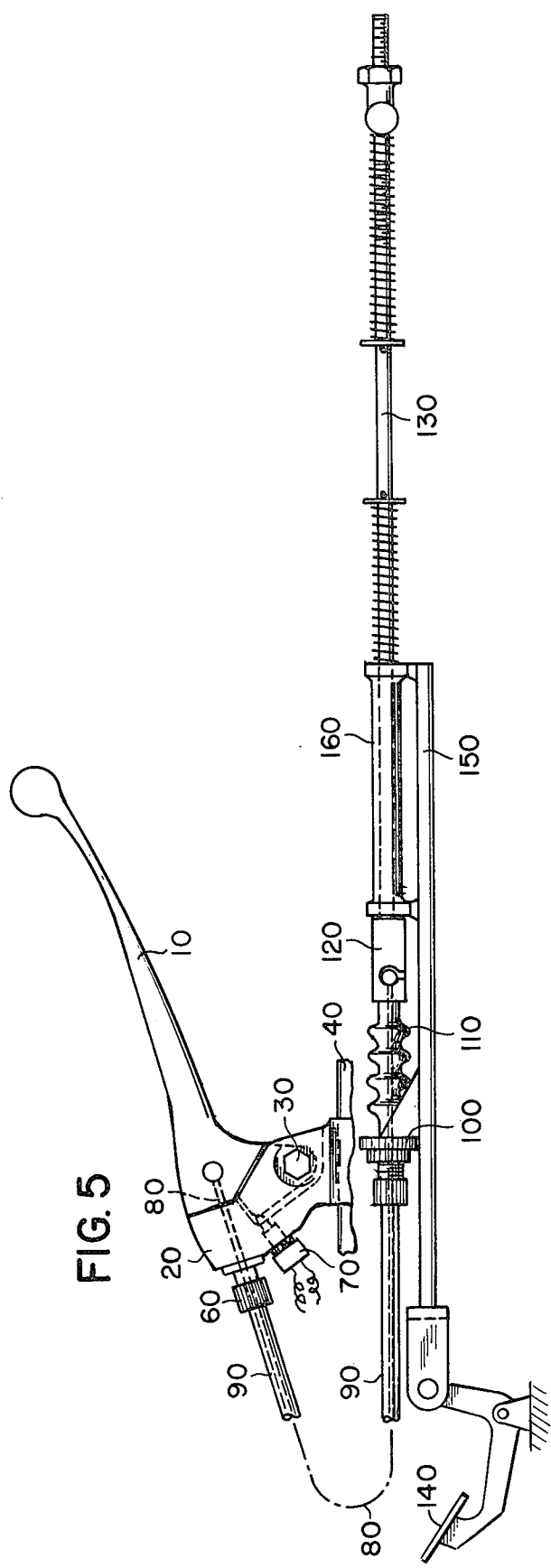
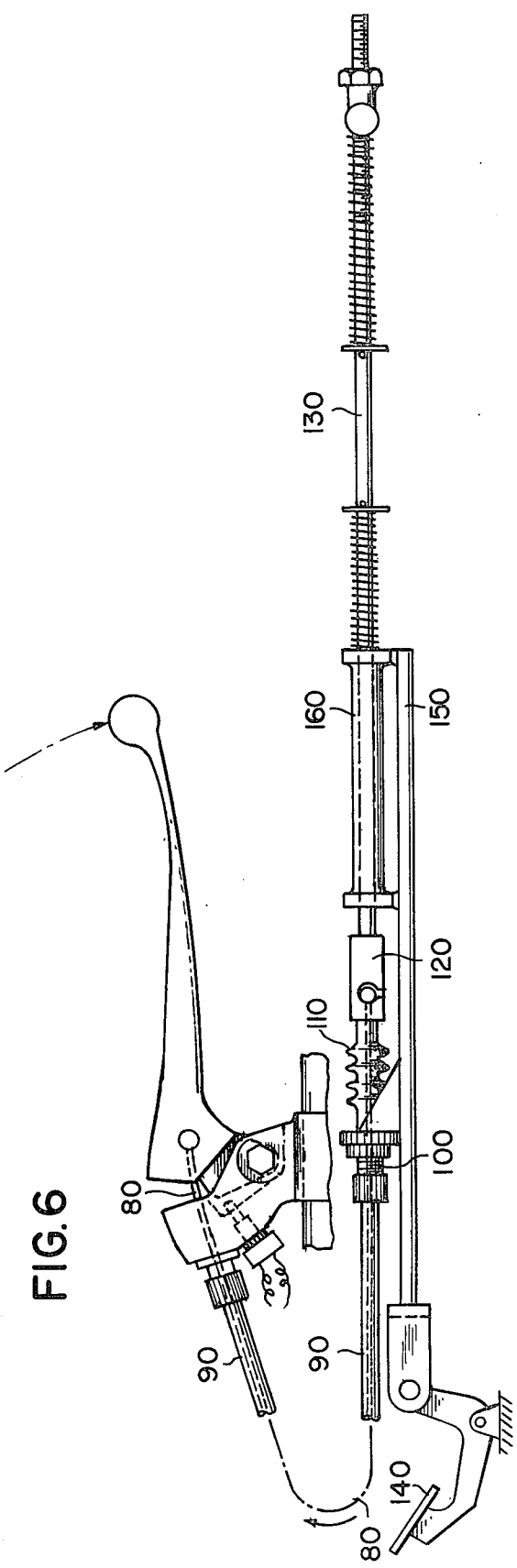

MOTORCYCLE BRAKE SYSTEM

SUMMARY OF THE INVENTION

The object of the invention is to provide a motorcycle with a brake system that will automatically provide a braking action that is properly balanced between the front and rear brakes. Thus, in this invention, a hand-operated lever (such as is conventionally mounted upon the handlebars of the motorcycle) is so linked to the brakes that its operation will cause both the front and the rear brakes to be simultaneously applied. A foot-operated pedal, such as is conventionally mounted on the side of the motorcycle, is linked to the brakes in such a manner that operating the pedal causes only the rear brake to be applied. Thus, the motorcycle may be stopped by using the lever only, rather than using a lever and a pedal simultaneously and balancing the pressure applied to each.

BRIEF DESCRIPTION OF THE DRAWINGS

In the drawings:
FIGS. 1–4 show various views of the lever used in the invention; and
FIGS. 5–6 show the operation of the linkage connecting the rear brake of the invention to the other components of the invention.

DETAILED DESCRIPTION OF PREFERRED EMBODIMENTS

A motorcycle (not shown) has front and rear brakes (also not shown). The front brake, can be applied by the motion of a flexible cable, as is conventional practice. The rear brake, as is also conventionally practiced, can be applied by the forward motion of an elongated rod.

In FIG. 1 is shown a hand-operated lever 10 pivotally connected to lever body 20 by pivot 30. The body is connected to the handlebars 40 of the motorcycle by a C-shaped clamp 50 disposed at the lower portion of the body. Attached to the body are two like cable sleeve adjusters 60 and a switch 70. The adjusters are hollow tubes with knurled nuts threaded on their outsides, and serve, as is conventional practice, to move the sleeve enclosing a flexible cable with respect to the cable itself.

It can be seen in FIGS. 5 and 6 that cables 80 enclosed by sleeves 90 are passed through the adjusters, with the cables being attached to the lever and the sleeves abutting the adjuster nuts. One of these cables is connected to the front brake of a motorcycle (not shown). The other cable passes through a second fixed adjuster 100, through a hollow rubber boot 110, to a cylindrical block 120 where it is attached. The block is rigidly attached to the front end of an elongated rod 130 which operates the rear brake (not shown) of a motorcycle upon being moved forwardly. Thus, whenever the lever 10 is operated, the cable pulls the block towards adjuster 100, compressing the boot, and pulling the rod 130.

A foot-operated pedal mechanism 140 pulls an elongated rod 150 forwardly when the pedal is depressed. To the rod 150 is secured a cylinder 160 with an axial bore through which rod 130 is passed. Cylinder 160 is disposed directly behind block 120, and thus pushes the block forwardly when the pedal is depressed.

When the foot pedal is thus depressed, the rod 130 is thus pulled forwardly and the rear brake is applied. The cable flexes outwardly and thus does not push the lever down and apply the front brake, when the foot brake is applied. When the hand-operated lever is applied, the rod 130 slides through the cylinder 160, leaving the foot-operated pedal unchanged in position.

While the invention has been described with particular reference to the drawings, the protection sought is to be limited only by the terms of the claims which follow.

What is claimed is:

1. Apparatus for use with a motorcycle having handle bars, a front wheel brake and a rear wheel brake for providing a braking action that is properly balanced between front and rear brakes, said apparatus comprising:
   a hand operated lever secured to the handle bars, said lever having a first position at which no braking action ensues and a second position at which both front and rear brakes are actuated;
   a first cable connected between said lever and the front brake, said first cable causing the front brake to be actuated when the lever is in the second position, said front brake being deactuated when the lever is in the first position;
   an elongated horizontal rod connected at its end to the rear brake and extending forwardly, said rod being slidable along its axis between a rear position at which the rear brake is deactuated and a forward position at which the rear brake is actuated; and
   a second cable connected between the lever and the rod, said second cable placing the rod in its rear position when the lever is in its first position and placing said rod in its forward position when the lever is in its second position.

2. Apparatus of claim 1 wherein the motorcycle has a foot pedal further including means connected to the pedal and to said rod to place said rod in its forward position when the pedal is depressed so that the rear brakes can be actuated without the front brakes being actuated when the lever is in the first position and the pedal is depressed.

3. The apparatus of claim 2 further including a normally open switch coupled to said lever, said switch being closed when the lever is in the second position.

* * * * *